US011106394B2

(12) United States Patent
Roy

(10) Patent No.: US 11,106,394 B2
(45) Date of Patent: Aug. 31, 2021

(54) STORING AN ENTITY AS AN OBJECT OR A FILE IN A HYBRID STORAGE SYSTEM BASED ON AN ACCESSING PROTOCOL

(71) Applicant: EMC IP Holding Company LLC, Hopkinton, MA (US)

(72) Inventor: Dipankar Roy, San Jose, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 35 days.

(21) Appl. No.: 16/698,133

(22) Filed: Nov. 27, 2019

(65) Prior Publication Data

US 2021/0157521 A1 May 27, 2021

(51) Int. Cl.
*G06F 3/06* (2006.01)
(52) U.S. Cl.
CPC .......... *G06F 3/0659* (2013.01); *G06F 3/0604* (2013.01); *G06F 3/068* (2013.01); *G06F 3/0652* (2013.01)
(58) Field of Classification Search
CPC .... G06F 3/0659; G06F 3/0604; G06F 3/0652; G06F 3/068; G06F 3/0619; G06F 3/061; G06F 3/0643; G06F 3/0638; G06F 3/0601
See application file for complete search history.

(56) References Cited

U.S. PATENT DOCUMENTS

| | | | | |
|---|---|---|---|---|
| 8,977,662 B1* | 3/2015 | Hilliar | ................... | G06F 16/185 707/829 |
| 10,430,103 B1* | 10/2019 | Jamail | ..................... | G06F 3/067 |
| 10,929,419 B2* | 2/2021 | Beard | ................. | G06F 16/2228 |
| 2012/0330894 A1* | 12/2012 | Slik | ........................ | G06F 16/196 707/626 |
| 2013/0185258 A1* | 7/2013 | Bestler | ............... | G06F 16/1844 707/638 |
| 2016/0267103 A1* | 9/2016 | Slik | ........................ | G06F 16/183 |
| 2017/0091296 A1* | 3/2017 | Beard | ................... | G06F 16/258 |
| 2017/0249331 A1* | 8/2017 | Yammine | ............ | G06F 11/1448 |
| 2021/0019072 A1* | 1/2021 | Marivoet | .............. | G06F 3/0659 |

* cited by examiner

*Primary Examiner* — Tracy A Warren
(74) *Attorney, Agent, or Firm* — Amin, Turocy & Watson, LLP

(57) ABSTRACT

Storing an entity as an object or a file in a hybrid storage system based on an accessing protocol is presented herein. In response to determining that a request to modify a data entity is based on an object storage protocol, and in response to determining that the data entity is a first object that is represented as a first file in a file storage device, the hybrid storage system creates the first object in an object storage device and deletes the first file. Further, in response to determining that the request is based on a file storage protocol, and that the data entity is a second file that is represented as a second object in the object storage device, the hybrid storage system creates the second file in the file storage device and deletes the second object.

20 Claims, 18 Drawing Sheets

STORING AN ENTITY AS AN OBJECT OR A FILE IN A HYBRID STORAGE SYSTEM BASED ON AN ACCESSING PROTOCOL

TECHNICAL FIELD

The subject disclosure generally relates to embodiments for storing an entity as an object or a file in a hybrid storage system based on an accessing protocol.

BACKGROUND

Hybrid storage solutions include both file storage and object storage. In a hybrid storage system, it is possible to access the file storage device using the object storage protocol and the object storage device using the file storage protocol. In this regard, when an object is created inside the file storage device or file namespace using an object storage protocol, this can result in a loss of data, loss of protocol semantics and reduced performance. Similarly, when a file is created inside the object storage device or object namespace using a file storage protocol, it can also result in a loss of data and protocol semantics. For example, when a file is created inside the object storage device using the file storage protocol, the file is automatically converted into an object because of the nature of the underlying, or object-based, storage device. This can result in a loss of file storage protocol attributes, file storage protocol specific locking primitives, file storage protocol specific access control lists, etc.

Conversely when an object is created inside the file storage device using the object storage protocol, the object is automatically converted into a file because of the nature of the underlying, or file-based, storage device. This can result in a loss of object storage protocol attributes such as naming conventions that are less restrictive than file naming conventions, object lengths being less restrictive than file lengths, limitations on delimiters that are less restrictive than file limitations on corresponding delimiters, and can result in performance issues corresponding to the underlying storage device, etc. Consequently, conventional storage systems have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
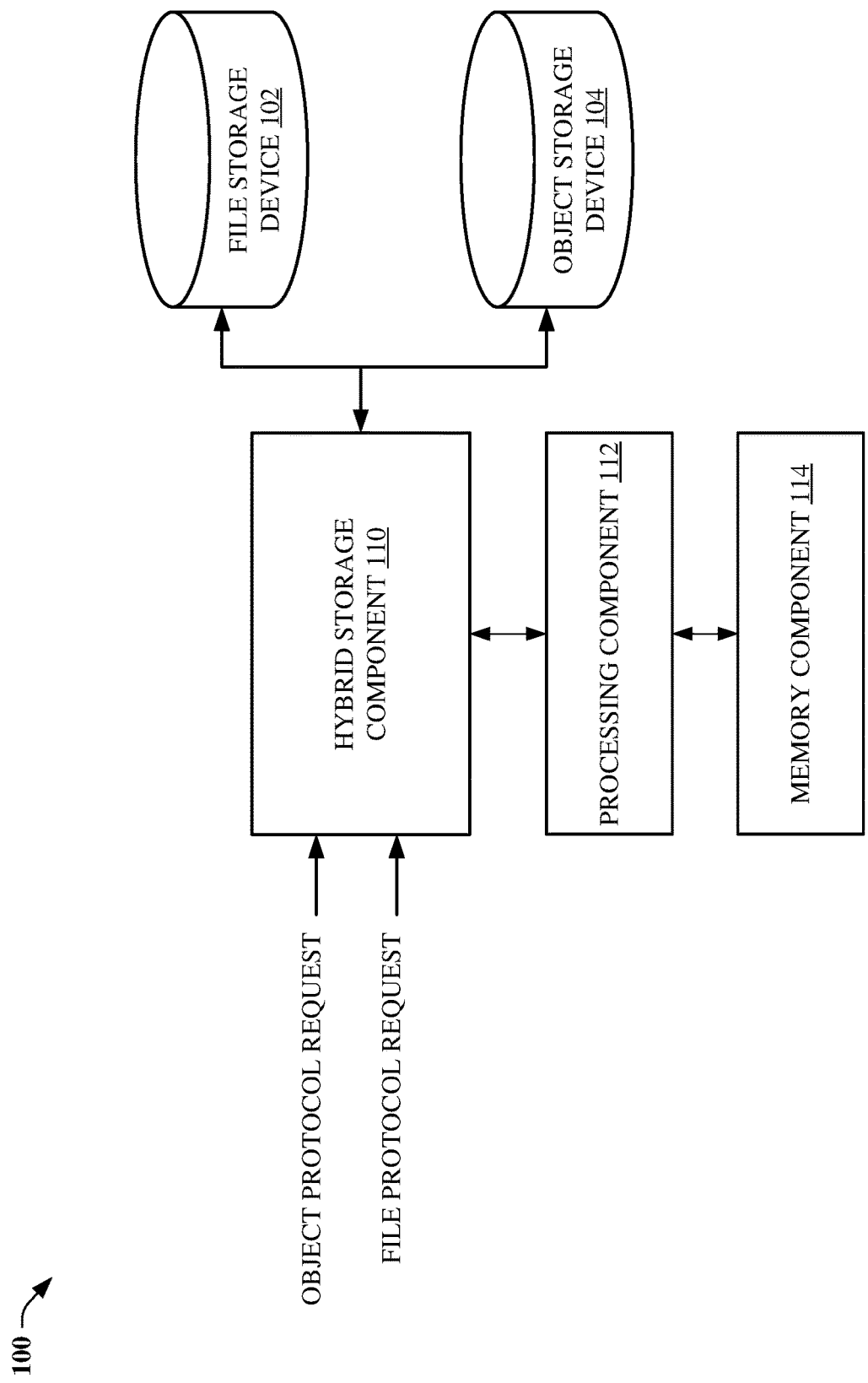
FIG. 1 illustrates a block diagram of a system comprising a hybrid storage component that stores an entity as an object or a file based on an accessing protocol, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional storage systems have had some drawbacks with respect to storing a data entity using a disparate storage protocol, e.g., converting a data entity into an underlying storage implementation having an associated storage protocol that is different from the storage protocol accessing the data entity. On the other hand, various embodiments disclosed herein can improve storage system performance by choosing to store the data entity intelligently based on the accessing protocol.

For example, a system, e.g., a hybrid storage system, an elastic cloud storage (ECS) system, a gateway, etc. can comprise a processor; and a memory that stores executable components that, when executed by the processor, facilitate performance of operations by the system, the executable components comprising: a hybrid storage component comprising an object storage protocol component and a file storage protocol component. The hybrid storage component receives a request to access, e.g., create, update, write, read, delete, etc. a data entity, e.g., object, file, etc. that will be, or has been, stored in an underlying storage device, e.g., file storage device, object storage device, etc. of the system.

In turn, in response to the data entity being determined, by the system, to be an object that has been represented, via a file reference, as a file in the file storage device, and in response to the request being determined to be a request to update or write the object, the object storage protocol component creates, via the object storage protocol, a new object comprising the data entity in the object storage device and deletes, via the object storage protocol, the file and the file reference in the file storage device.

Further, in response to the data entity being determined, by the system, to be a file that has been represented, via an object reference, as an object in the object storage device, and in response to the request being determined to be a request to update or write the file, the file storage protocol component creates, via the file storage protocol, a new file comprising the data entity in the file storage device and deletes, via the file storage protocol, the object and the object reference in the object storage device.

In an embodiment, in response to the object being determined, by the system, to be represented by the object reference, the object storage protocol component creates a new object in the object storage device. In this regard, in one embodiment, the object storage protocol component updates or writes the object by optionally deleting the object from a container, bucket, etc. in the object storage device, and creating the new object in the container, bucket, etc. in an atomic operation.

In another embodiment, in response to the object being determined, by the system, to not be represented by any object reference, and in response to a container of the object being determined, by the system, to not be mapped to a directory of the file storage device, the object storage protocol component creates the new object in the object storage device.

In yet another embodiment, in response to the object being determined, by the system, to not be represented by any object reference, and in response to a container of the object being determined, by the system, to be mapped to a directory in the file storage device, the object storage protocol component determines, via the object storage protocol, whether an existing file in the file storage device comprises a pathname representing a key of the object.

In this regard, in response to the existing file in the file storage device being determined to not comprise the pathname representing the key of the object, the object storage protocol component creates the new object in the object storage device.

In an embodiment—in which the data entity is an existing file—in response to the existing file being determined, by the file storage protocol component via the file storage protocol, to be represented by the file reference, the file storage protocol component writes or updates the existing file in the file storage device.

In one embodiment, in response to a pathname of the file being determined, by the system, to be mapped to a container in the object storage device, and in response the container being determined, by the system, to not include any object that has a key that matches the pathname of the file, the file storage protocol component creates the file in the file storage device.

In another embodiment, a method comprises: in response to receiving a request to access a data entity, determining, by a system comprising a processor, whether the request is based on an object storage protocol or a file storage protocol; and in response to the request being determined to be based on the object storage protocol and in response to the data entity being determined to be an object that has been represented as a first file in a file storage device, creating, by the system, a first object comprising the data entity in an object storage device and deleting, by the system, the first file in the file storage device, and in response to the request being determined to be based on the file storage protocol and in response to the data entity being determined to be a file that has been represented as a second object in the object storage device, creating, by the system, a second file comprising the data entity in the file storage device and deleting, by the system, the second object in the object storage device.

In one embodiment, the method comprises: in response to a request to access a data entity being determined to be based on an object storage protocol and in response to an underlying storage or namespace being determined to be a file storage device, creating, by the system, an object comprising the data entity in the object storage device, and in response to the request being determined to be based on a file storage protocol and in response to the underlying storage or namespace being determined to be the object storage device, creating, by the system, a file comprising the data entity in the file storage device.

In yet another embodiment, the creating the first object comprises: in response to the request being determined to be based on the object storage protocol and in response to the data entity being determined to be stored as an object in the object storage device, optionally deleting the object from a container in the object storage device and creating the first object in the container.

In an embodiment—in which the data entity is an object—the method further comprises: in response to the request being determined to be based on the object storage protocol, in response to the object storage device being determined to not contain a container of the object, and in response to the container of the object being determined to not be represented as a directory in the file storage device, creating, by the system, the container and the object in the object storage device.

In one embodiment—in which the data entity is an object—the method further comprises: in response to the request being determined to be based on the object storage protocol, in response to the object storage device being determined to not contain a container of the object, and in response to the container of the object being determined to be represented as a directory in the file storage device, determining, by the system, whether an existing file in the file storage device comprises a pathname representing a key of the object.

In another embodiment, the method further comprises: in response to the exiting file in the file storage device being determined to comprise the pathname representing the key of the object, deleting, by the system, the existing file and creating, by the system, the container and the object in the object storage device.

In yet another embodiment, the method further comprises: in response to the exiting file in the file storage device being determined to not comprise the pathname representing the key of the object, creating, by the system, the container and the object in the object storage device.

In an embodiment, the method further comprises: in response to the request being determined to be based on the file storage protocol, and in response to the data entity being determined to be stored as a file in the file storage device, creating/writing/updating, by the system, the file in the file storage device.

In one embodiment—in which the data entity is a file—the method further comprises in response to the request being determined to be based on the file storage protocol, in response to the object storage device being determined to contain a container that has been mapped to a pathname of the file, and in response to the container being determined to not include an object having a key that matches the pathname of the file, creating, by the system, the file in the file storage device.

Another embodiment comprises a machine-readable medium comprising instructions that, in response to execution, cause a system comprising a processor to perform operations, comprising: determining whether a request to modify a data entity is based on an object storage protocol or a file storage protocol; and in response to the request being determined to be based on the object storage protocol and in response to the data entity being determined to be a first object that is represented as a first file in a file storage device, creating the first object in an object storage device and deleting the first file; and in response to the request being determined to be based on the file storage protocol and in response to the data entity being determined to be a second file that is represented as a second object in the object storage device, creating the second file in the file storage device and deleting the second object.

In an embodiment, the operations further comprise: in response to the request being determined to be based on the object storage protocol and in response to the data entity being determined to be an object that is stored in the object storage device, optionally deleting the object in the object storage device and creating a new object comprising the data entity in the object storage device; and in response to the request being determined to be based on the file storage protocol and in response to the data entity being determined to be a file that is stored in the file storage device, creating/writing/updating the file in the file storage device.

As described above, conventional storage systems have had some drawbacks with respect to storing a data entity using a disparate storage protocol, e.g., converting a data entity into an underlying storage implementation having a corresponding storage protocol that is different from a storage protocol accessing the data entity. On the other hand, various embodiments disclosed herein can improve storage system performance by choosing to store the data entity intelligently based on the accessing protocol In this regard, and now referring to FIG. 1, a system (100) comprising a hybrid storage component (110) can comprise, e.g., a hybrid storage system, a gateway device, etc. comprising file storage (102) and object storage (104). In embodiment(s), the system can comprise a distributed file system, an ECS system, a parallel distributed networked file system, a OneFS™ file system provided by Dell EMC® Isilon Systems (e.g., utilizing a FreeBSD based operating system), etc. In various embodiment(s), the distributed file system can comprise a host server, a client server, etc. In other embodiment(s), various components of the distributed file system can be included in a host application, a client application, storage/data services, etc.

Figure 17:
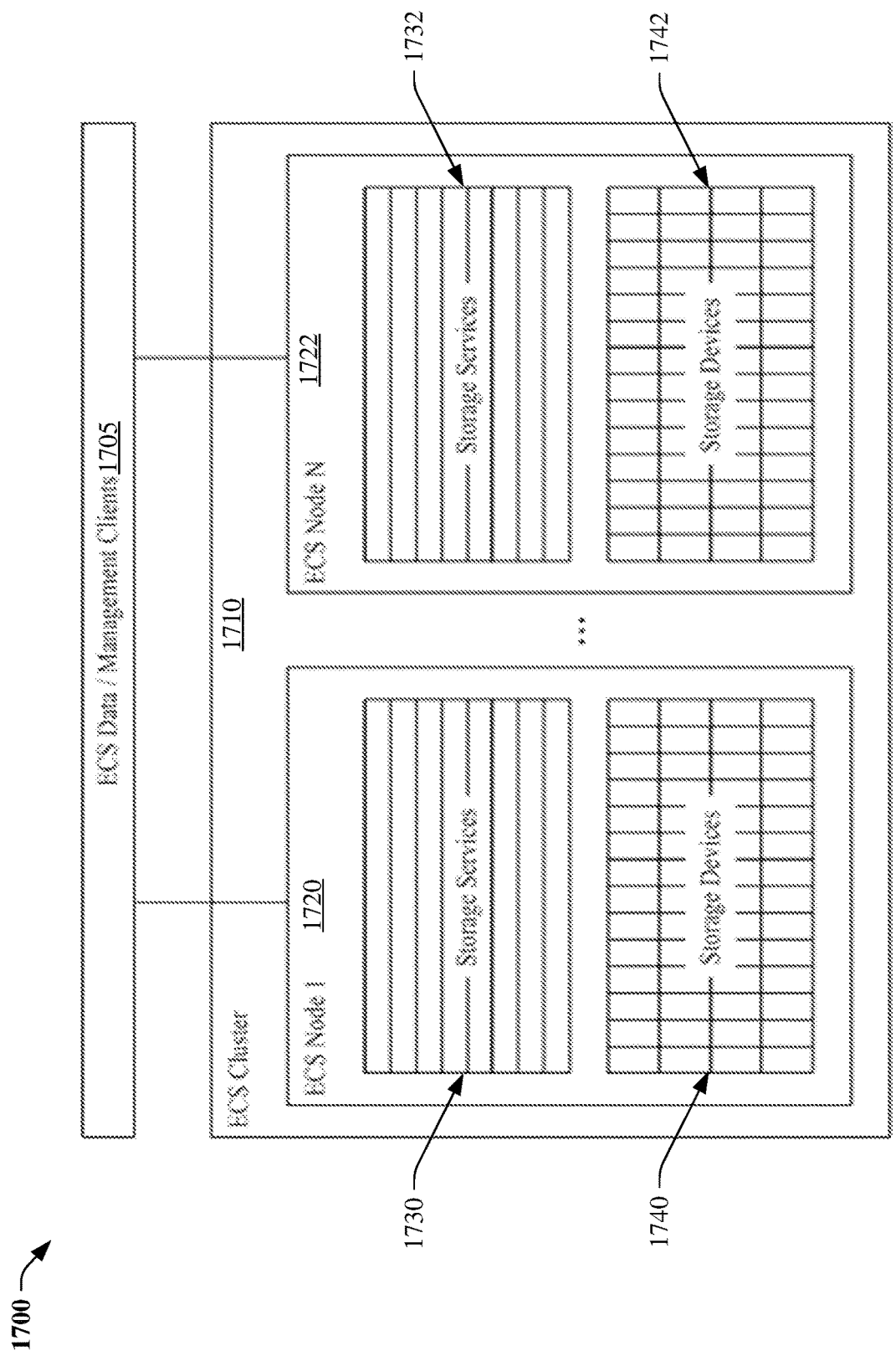
FIG. 17 illustrates a block diagram of an elastic cloud storage (ECS) system, in accordance with various example embodiments.

Referring now to FIG. 17, a Dell EMC® Isilon file storage system (1700) can comprise a cloud-based object storage appliance (e.g., comprising storage control software, components (e.g., 110, 210, 220, etc.); ECS data clients/management clients (1705); storage services (1730, 1732) and storage devices (102, 104, 1740, 1742) (e.g., comprising storage media, physical magnetic disk media, solid-state drive (SSD) media, e.g., flash storage, etc.) of a storage cluster (1710). In this regard, the cloud-based object storage appliance is a type of clustered file system that spreads data across multiple storage nodes (1720, 1722), e.g., usually for redundancy or performance. Further, such clustered file system can simultaneously be mounted on multiple file servers (not shown), e.g., OneFS™ clusters, and can provide features like location-independent addressing and redundancy which can improve reliability and/or reduce the complexity of portion(s) of a cluster, e.g., storage cluster, data storage cluster, data cluster, etc.

As illustrated by FIG. 17, the storage service(s) and storage device(s) can be included in respective data storage nodes (1720, 1722) of clusters (1710), e.g., storage clusters, data storage clusters, data clusters, etc., e.g., combined as an integrated system—with no access to the storage devices other than through the Dell EMC® Isilon file storage system. In this regard, the respective nodes, storage nodes, data storage nodes, etc. can be communicatively and/or operatively coupled to each other, with the storage service(s) comprising respective processes, processing jobs, job worker processes, applications, etc. that can be utilized to service user requests according to user-based storage policies.

In general, the respective data storage nodes can communicate with user devices via wired and/or wireless communication network(s) to provide access to services that are based in the cloud and not stored locally (e.g., on a user device). A typical cloud-computing environment can include multiple layers, aggregated together, which interact with each other to provide resources for end-users.

The Dell EMC® Isilon file storage system can support storage, manipulation, and/or analysis of unstructured data on a massive scale on commodity hardware. As an example, the Dell EMC® Isilon file storage system can support mobile, cloud, big data, and/or social networking applications. In another example, the Dell EMC® Isilon file storage system can be deployed as a turnkey storage appliance, or as a software product that can be installed on a set of qualified commodity servers and disks, e.g., within a node, data storage node, ECS node, etc. of a cluster, data storage cluster, ECS cluster, etc. In this regard, the Dell EMC® Isilon file storage system can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the Dell EMC® Isilon file storage system can write all object-related data, e.g., user data, metadata, object location data, etc. to logical containers, e.g., buckets, etc. of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed and/or closed—becoming immutable, e.g., read-only and delete only.

Further, a storage node (1720, 1722) of the cluster can comprise a system (100), a server, a file system, an image of the OS, data service(s), computer processing unit(s) (CPU (s)), storage devices (e.g., non-volatile memory devices, disk drives, solid-state drives, etc.), memory devices, (e.g., volatile memory devices, random access memory, etc.

Figure 2:
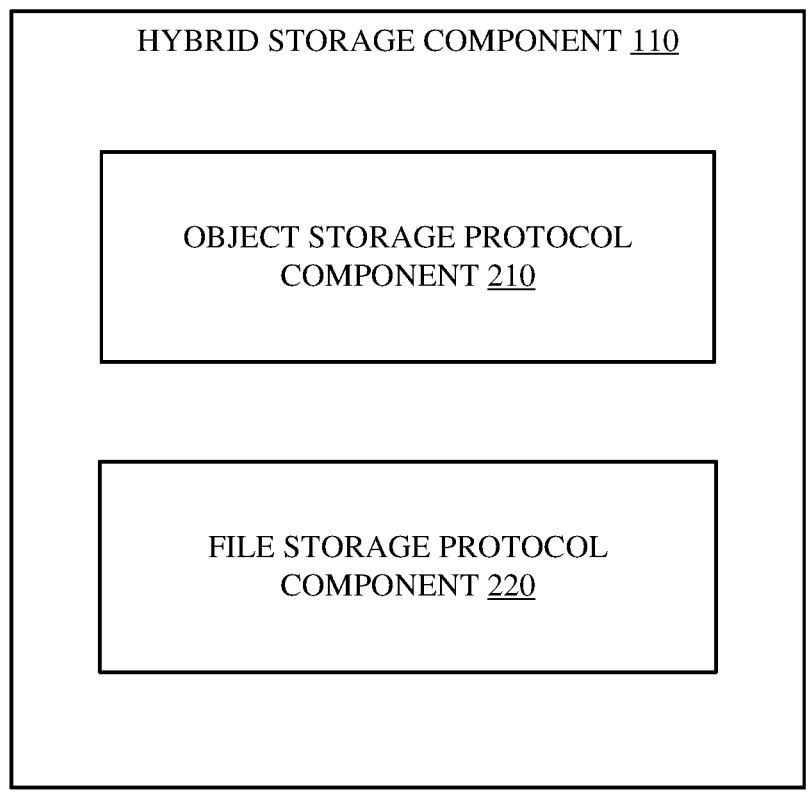
FIG. 2 illustrates a block diagram of a hybrid storage component, in accordance with various example embodiments.

Referring now to FIG. 2, the hybrid storage component (110) comprises an object storage protocol component (210) and a file storage protocol component (220). The hybrid storage component receives a request, e.g., object protocol request, file protocol request, etc. to access, e.g., create, update, write, read, delete etc. a data entity, e.g., object, file, etc. that will be or has been stored in a storage device, e.g., file storage device (102), object storage device (104), etc. of the system.

In turn, in response to the data entity being determined, by the system, to be an object that has been represented, via a file reference, as a file in the file storage device, and in response to the request being determined to be a request to update/create/write the object, the object storage protocol component creates, via the object storage protocol, a new object comprising the data entity in the object storage device and deletes, via the object storage protocol, the file and the file reference in the file storage device.

In this regard, the hybrid storage component prevents protocol data loss and semantics loss by preserving object storage protocol attributes of the object, e.g., an entity tag (etag), a hypertext transfer protocol (HTTP) etag, an owner of the object, etc. compared to when the object has been represented as a file via more restrictive file name conventions, size limitations, attribute limitations, etc.

Conversely, in response to the data entity being determined, by the file storage protocol component, via the file storage protocol, to be a file that has been represented, via an object reference, as the object in the object storage device, and in response to the request being determined to be a request to update or write the file, the file storage protocol component creates, via the file storage protocol, a new file comprising the data entity in the file storage device and deletes, via the file storage protocol, the object and the object reference in the object storage device.

In this regard, the hybrid storage component prevents protocol data loss and semantics loss by preserving file storage protocol attributes of a file, e.g., representing an owner of the file, one or more access control lists (ACLs), file storage protocol locks, e.g., shared locks, (server message block) SMB oplocks, network file system (NFS) version 4 (NFSv4) delegations, etc.

In an embodiment, in response to the object being determined, by the system, to be represented by the object reference, the object storage protocol component creates a new object in the object storage device. In this regard, in one embodiment, the object storage protocol component writes or updates the object by optionally deleting the object from a container, bucket, etc. in the object storage device, and creating the new object in the container, bucket, etc. in an atomic operation.

In another embodiment, in response to the object being determined, by the system, to not be represented by any object reference, and in response to a container of the object being determined, by the system, to not be mapped to a directory of the file storage device, the object storage protocol component creates the new object in the object storage device.

In yet another embodiment, in response to the object being determined, by the system, to not be represented by any object reference, and in response to a container of the object being determined, by the system, to be mapped to a directory in the file storage device, the object storage protocol component determines, via the object storage protocol, whether an existing file in the file storage device comprises a pathname representing a key of the object.

In this regard, in response to the existing file in the file storage device being determined to not comprise the pathname representing the key of the object, the object storage protocol component creates the new object in the object storage device.

In an embodiment—in which the data entity is an existing file—in response to the existing file being determined, by the file storage protocol component via the file storage protocol, to be represented by the file reference, the file storage protocol component writes or updates the existing file in the file storage device.

In one embodiment—in which the file is a first file and the data entity is a second file—in response to a pathname of the second file being determined, via the file storage protocol, to be mapped to a container in the object storage device, and in response the container being determined, via the file storage protocol, to not include any object that has a key that matches the pathname of the second file, the file storage protocol component creates the second file in the file storage device.

FIGS. 3-16 illustrate methodologies for preserving attribute(s) of a data entity, e.g., object, file, etc. when accessing the data entity via disparate storage protocols, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 3:
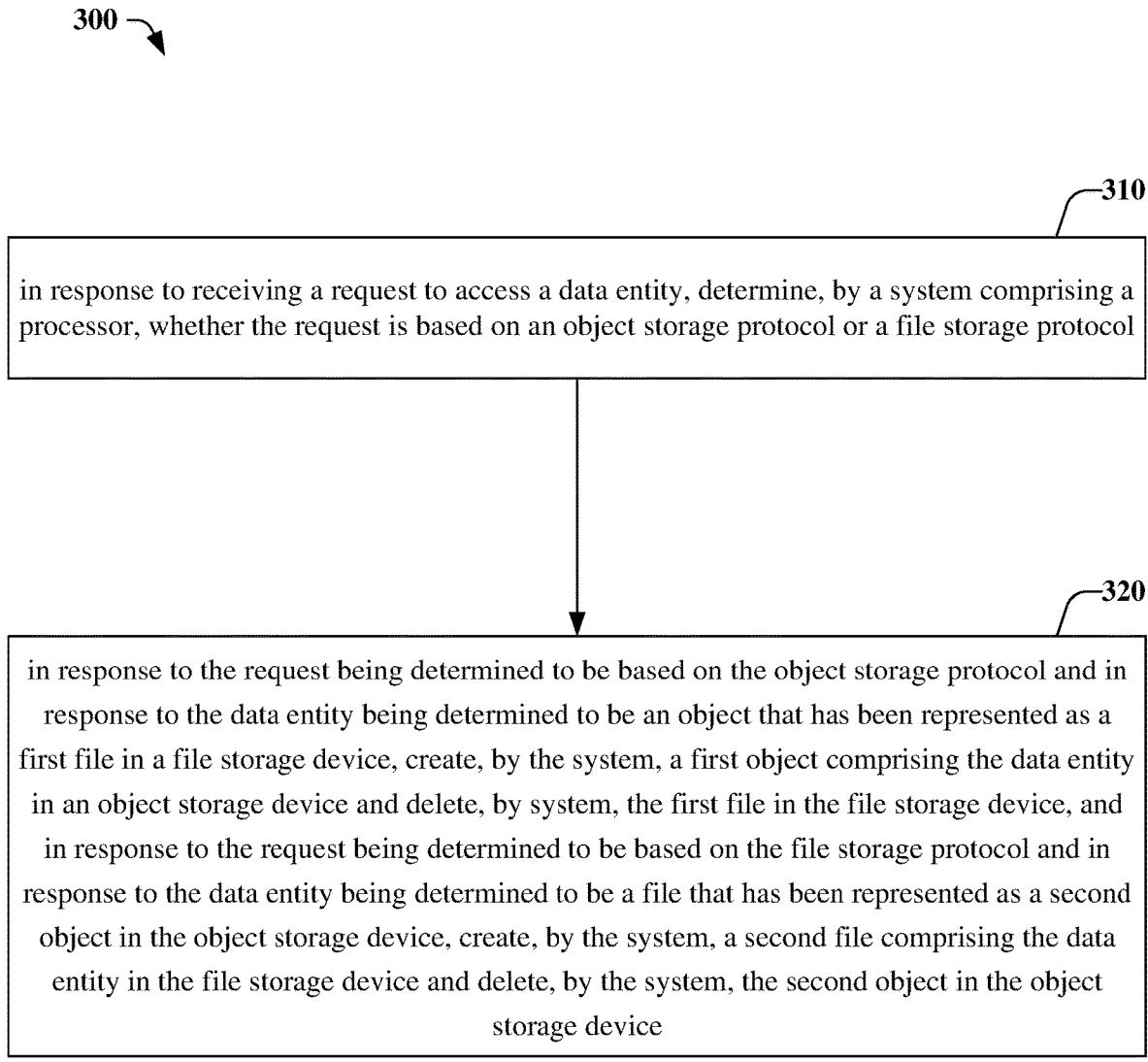
FIG. 3 illustrates a flow chart of a method that facilitates updating an object or a file based on an accessing protocol, in accordance with various example embodiments.

Referring now to FIG. 3, a flow chart (300) of a method that facilitates updating an object or a file based on an accessing protocol is illustrated, in accordance with various example embodiments. At 310, in response to receiving a request to access a data entity, a system (100) comprising a processor can determine whether the request is based on an object storage protocol or a file storage protocol.

At 320, in response to the request being determined to be based on the object storage protocol and in response to the data entity being determined to be an object that has been represented as a first file in a file storage device, the system can create a first object comprising the data entity in an object storage device and delete the first file in the file storage device, and in response to the request being determined to be based on the file storage protocol and in response to the data entity being determined to be a file that has been represented as a second object in the object storage device, the system can create a second file comprising the data entity in the file storage device and delete the second object in the object storage device.

Figure 4:
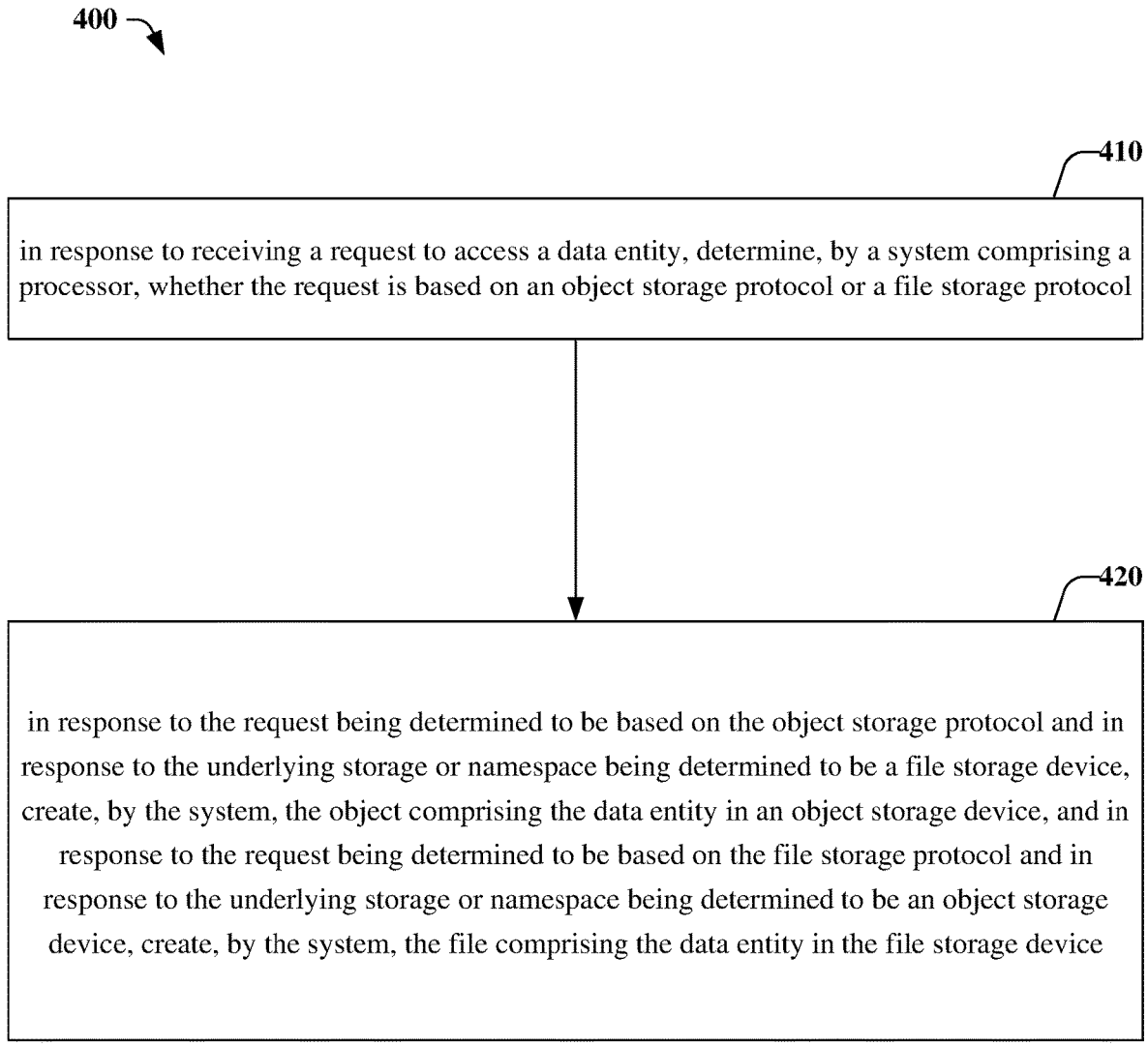
FIG. 4 illustrates a flow chart of another method that facilitates updating an object or a file based on an accessing protocol, in accordance with various example embodiments.
Figure 5:
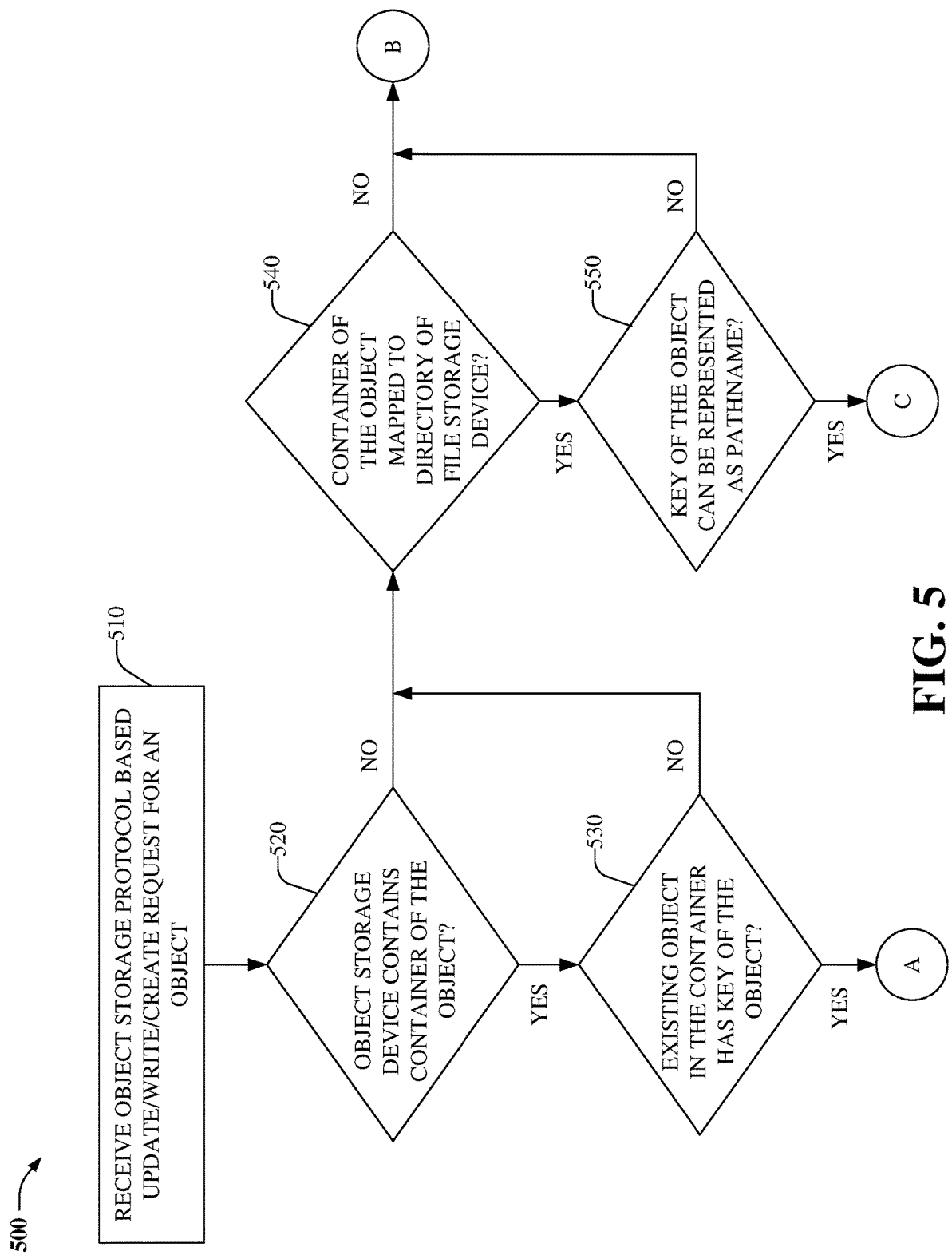
FIGS. 5-9 illustrate flow charts of a method that facilitates updating, via an object storage protocol, an object in a hybrid storage system, in accordance with various example embodiments.

FIG. 4 illustrates a flow chart (400) of another method that facilitates updating an object or a file based on an accessing protocol, in accordance with various example embodiments. At 410, in response to a request to access a data entity being received by a system (100) comprising a processor, the system can determine whether the request is based on an object storage protocol or a file storage protocol. At 420, in response to the request being determined to be based on the object storage protocol and in response to an underlying storage or namespace being determined to be a file storage device, the system can create an object comprising the data entity in an object storage device, and in response to the request being determined to be based on a file storage protocol and in response to the underlying storage or namespace being determined to be the object storage device, the system can create a file comprising the data entity in the file storage device.

FIGS. 5-9 illustrate flow charts (500-900) of a method performed by a system (100), e.g., a hybrid storage system, that facilitates updating, via an object storage protocol, an object in the system, in accordance with various example embodiments.

At 510, an object storage protocol based update/write/create request for an object is received. At 520, in response to a determination that an object storage device contains a container, bucket, etc. of the object, flow continues to 530; otherwise low continues to 540.

At 530, in response to a determination that an existing object in the container, bucket, etc. has a key of the object, flow continues to 610; otherwise flow continues to 540, at which it can be determined whether the container of the object is mapped to a directory of a file storage device. In this regard, in response to a determination that the container is mapped to the directory, flow continues to 550, at which it can be determined whether the key of the object can be represented as a pathname; otherwise flow continues to 710.

At 550, in response to a determination that the key of the object can be represented as the pathname, flow continues to 810; otherwise flow continues to 710.

Figure 6:
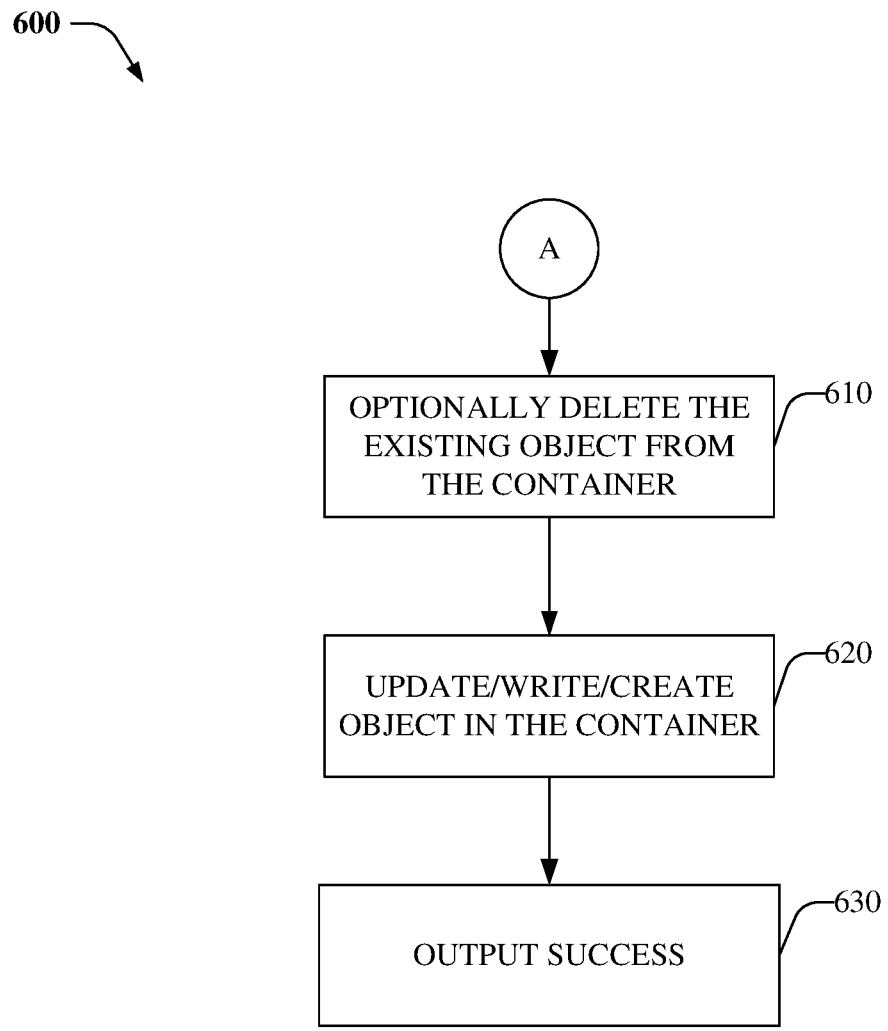

Referring now to FIG. 6, at 610, the existing object is optionally deleted from the container. Further, at 620, a new object representing the object is updated/created/written in the container; and at 630, a success is output, returned, reported, etc.

Figure 7:
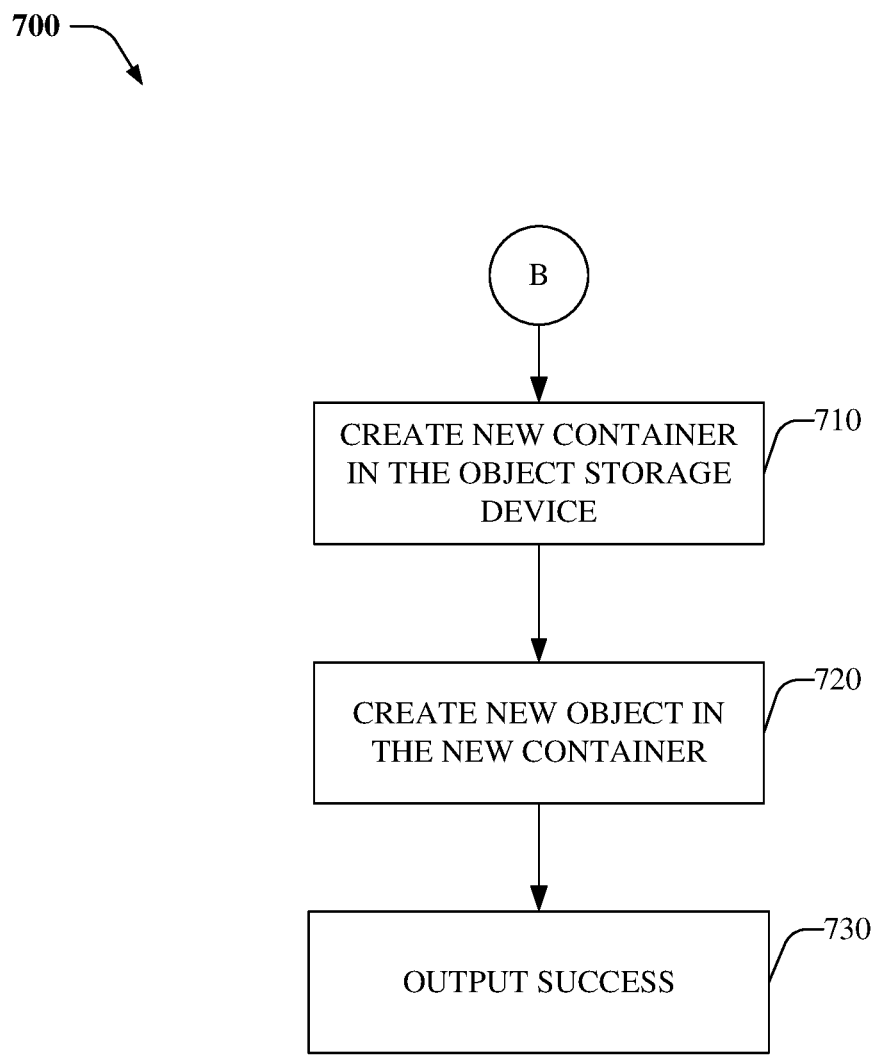

Referring now to FIG. 7, at 710, a new container, bucket, etc. is created in the object storage device. Further, at 720, a new object representing the data entity is created in the new container, bucket, etc.; and at 730, a success is output, returned, reported, etc.

Figure 8:
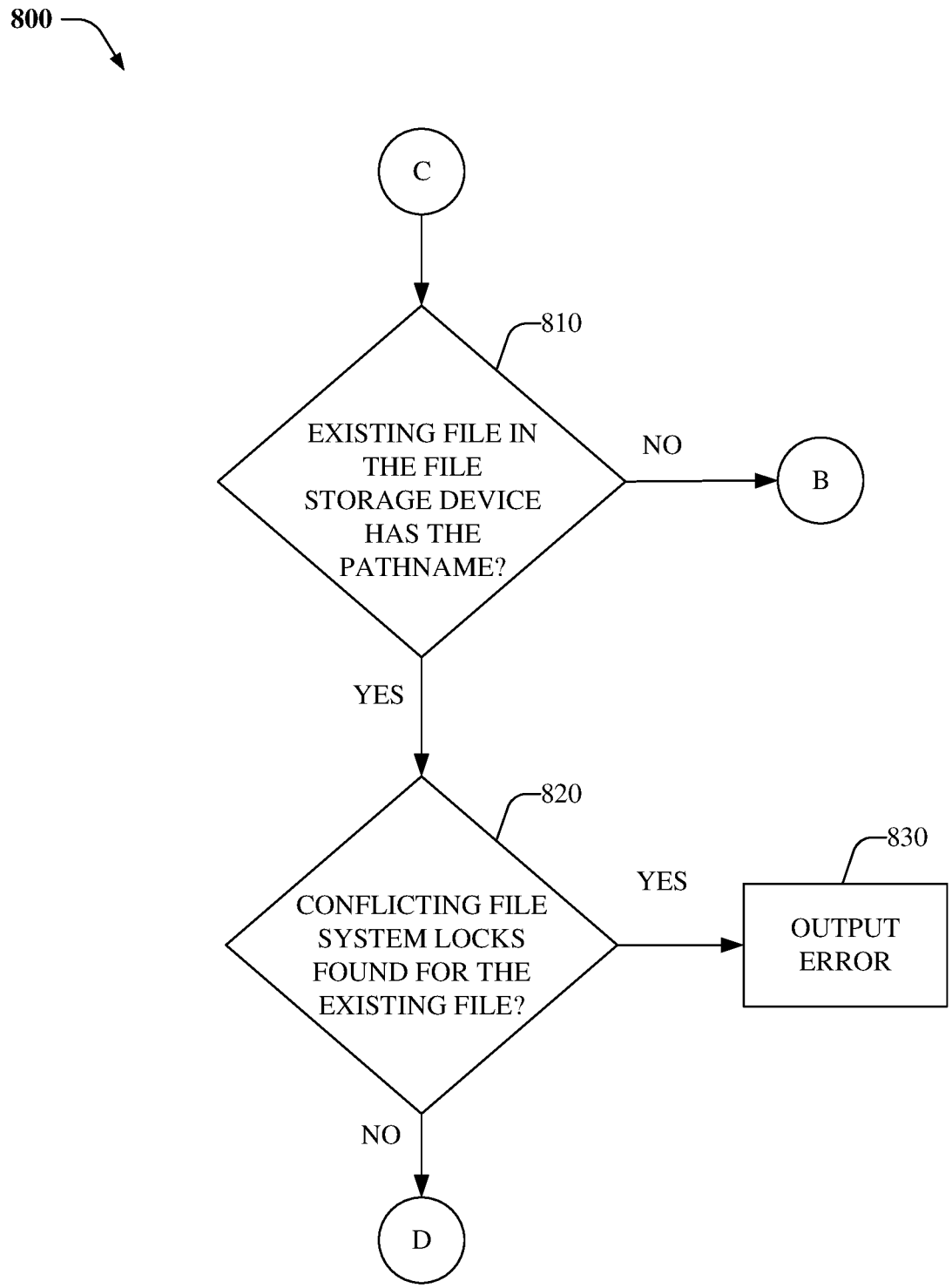
Figure 9:
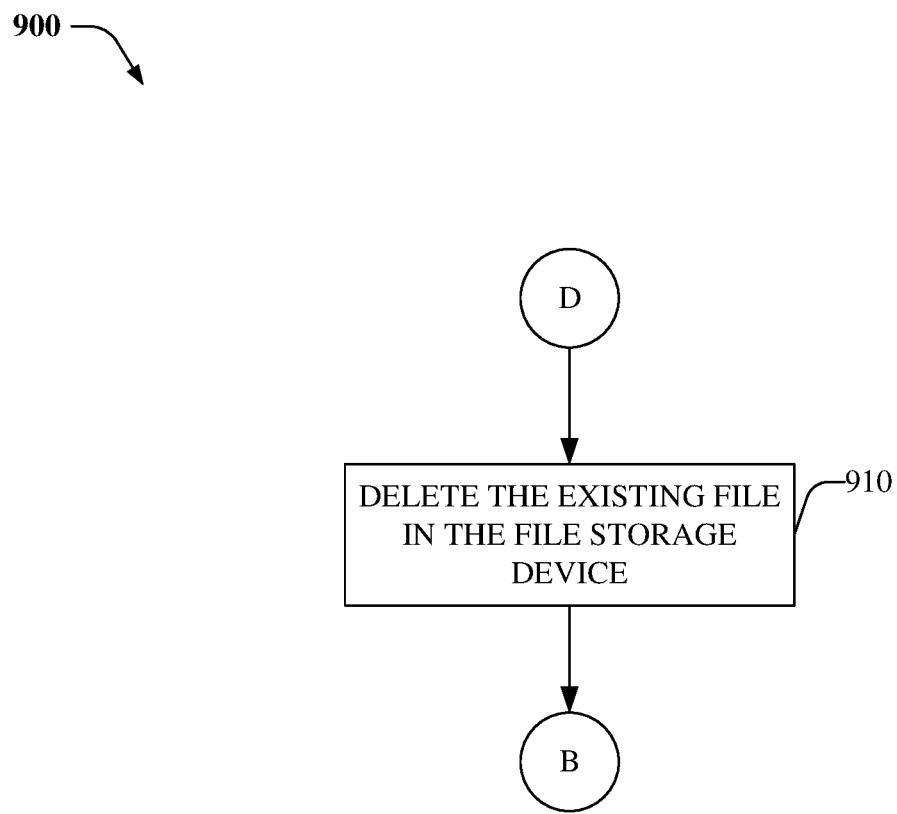

Referring now to FIG. 8, at 810, it can be determined whether the existing file in the file storage device has the pathname representing the key of the object. In this regard, in response to determining that the existing file in the file storage device has the pathname representing the key of the object, flow continues to 820, at which it can be determined whether conflicting file system locks have been found for the existing file; otherwise flow continues to 710.

At 820, in response to a determination that conflicting file system locks have been found for the existing file, flow continues to 830, at which an error is output, returned, reported, etc.; otherwise flow continues to 910, at which the existing file is deleted in the file storage device. Flow continues from 910 to 710.

Figure 10:
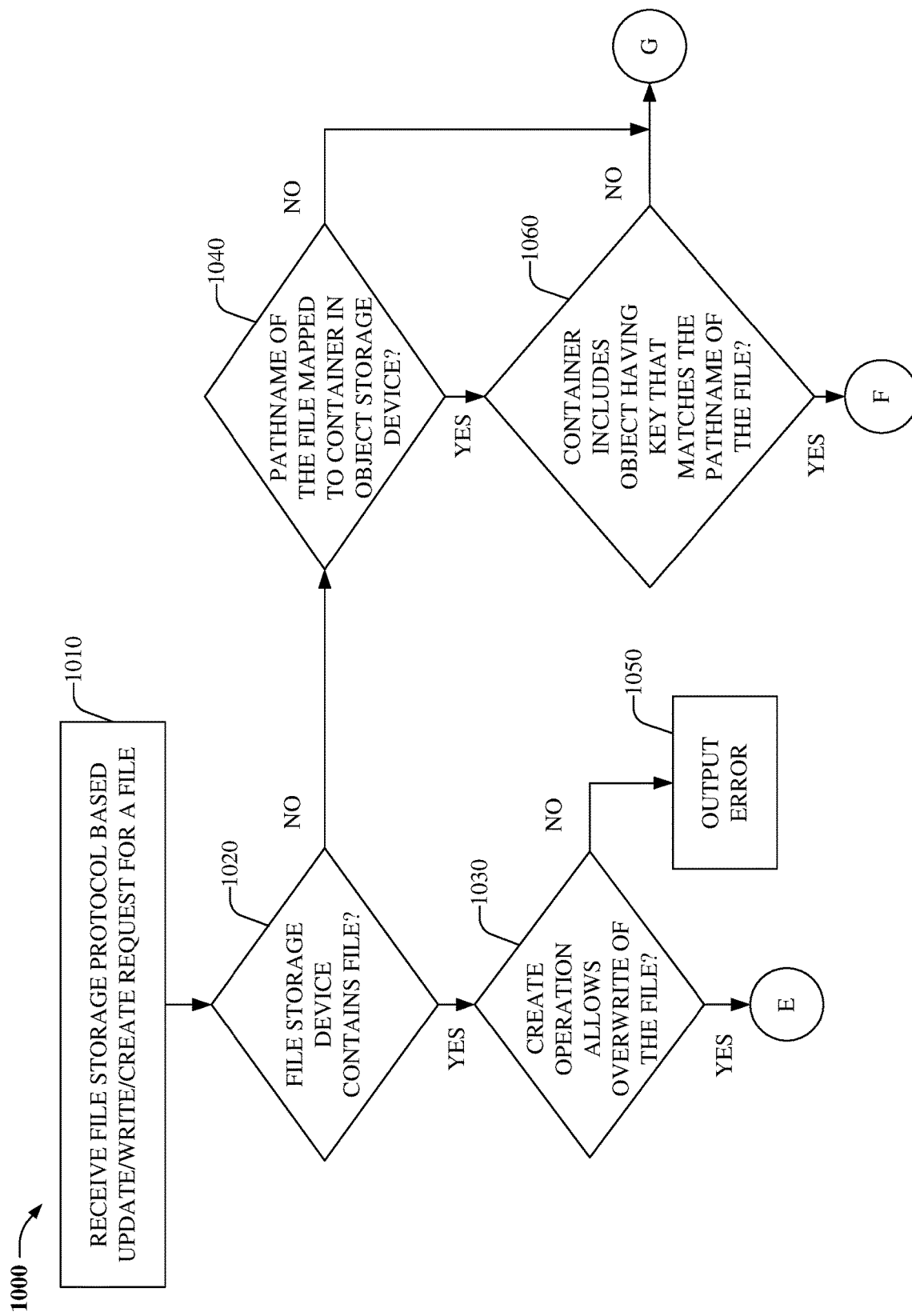
FIGS. 10-12 illustrate flow charts of a method that facilitates updating, via a file storage protocol, a file in a hybrid storage system, in accordance with various example embodiments.
Figure 11:
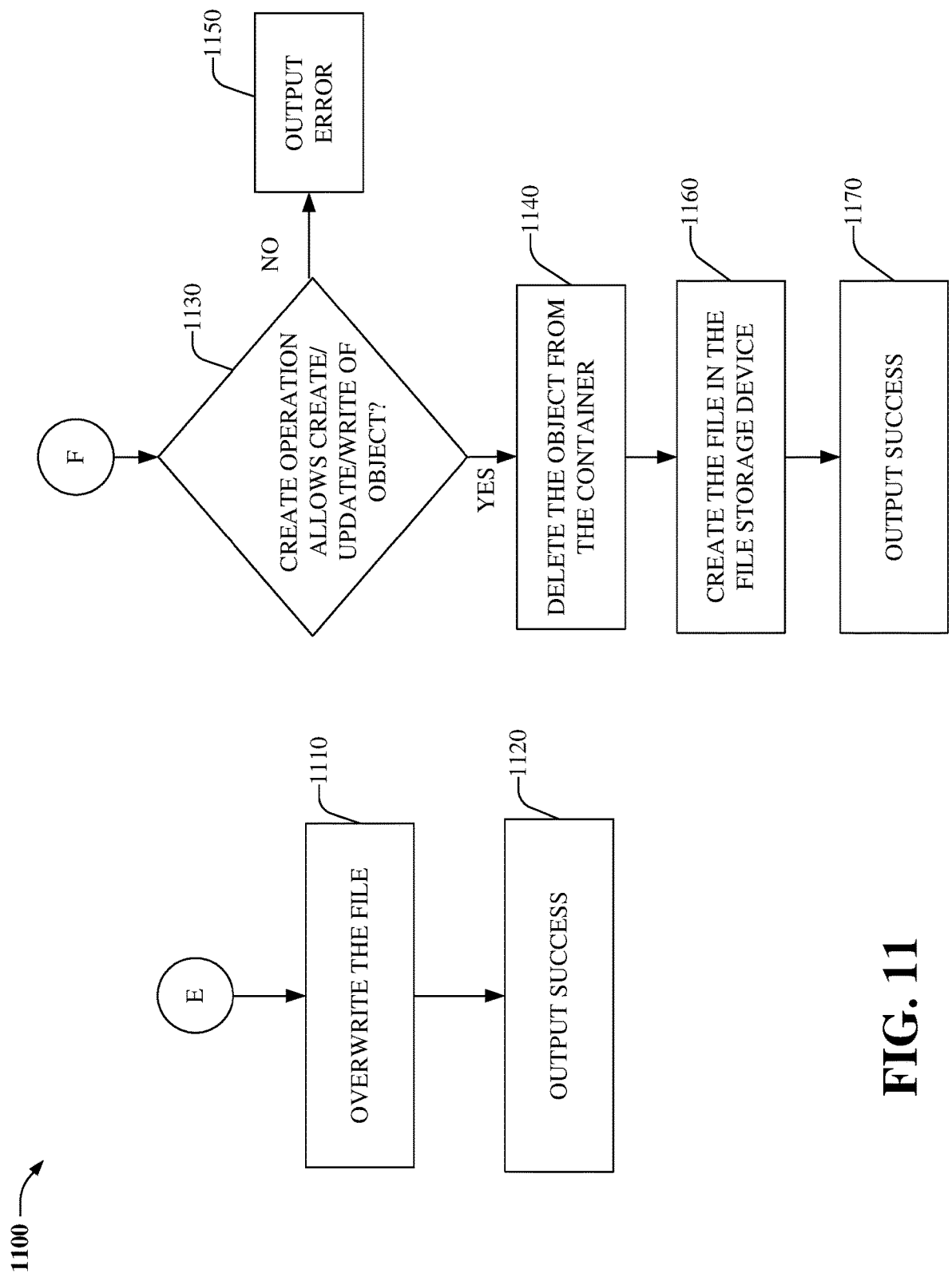
Figure 12:
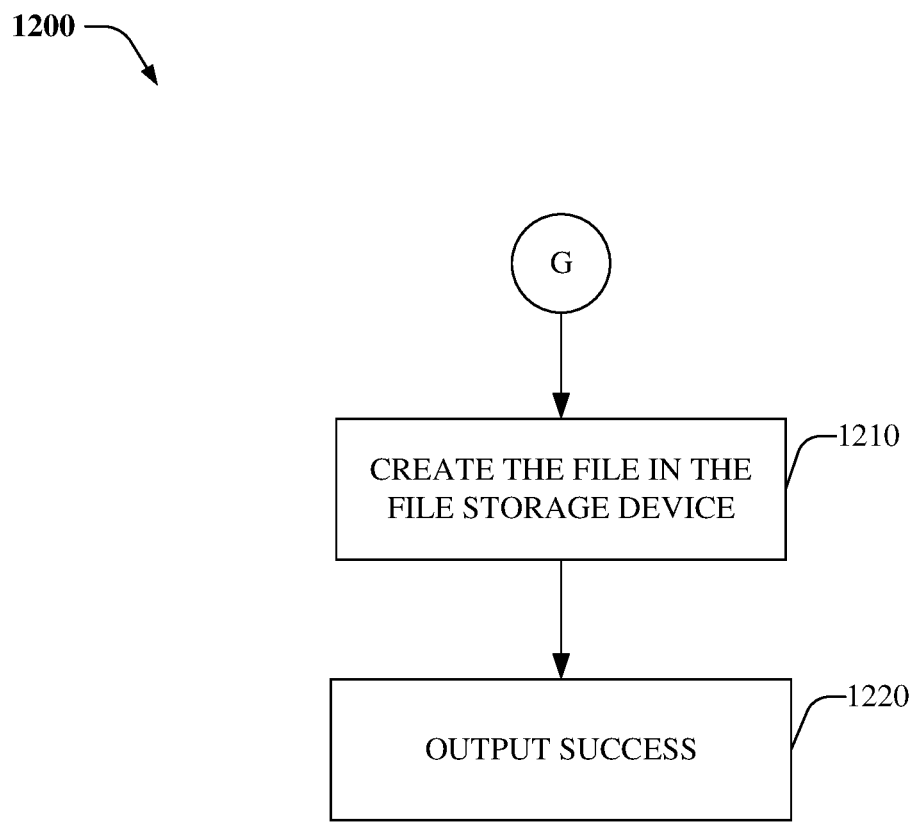

FIGS. 10-12 illustrate flow charts (1000-1200) of a method performed by a system (100), e.g., a hybrid storage system, that facilitates updating, via a file storage protocol, a file in the system, in accordance with various example embodiments. At 1010, a file protocol based update/write/create request for a file is received. At 1020, in response to a determination that a file storage device contains the file, flow continues to 1030, at which it can be determined whether a create operation allows an overwrite of the file; otherwise flow continues to 1040, at which it can be determined whether a pathname of the file has been mapped, assigned, etc. to a container, bucket, etc. in an object storage device.

In this regard, at 1030, in response to a determination that the create operation allows the overwrite of the file, flow continues to 1110, at which the overwrite of the file is performed, and flow further continues to 1120, at which a success is output, returned, reported, etc.; otherwise flow continues to 1050, at which an error is output, returned, etc.

At 1040, in response to a determination that the pathname of the file has been mapped, assigned, etc. to the container, bucket, etc., flow continues to 1060, at which it can be determined whether the container, bucket, etc. includes an object having a key that matches the pathname of the file; otherwise flow continues to 1210.

At 1060, in response to a determination that the container includes the object having the key that matches the pathname of the file, flow continues to 1130, at which it can be determined whether a create operation allows a write, update, or creation of the object; otherwise flow continues to 1210, at which the file is created in the file storage device, and flow further continues to 1220, at which a success is output, returned, reported, etc.

At 1130, in response to a determination that the create operation allows the write, update, or creation of the object, flow continues to 1140; otherwise flow continues to 1150, at which an error is output, returned, reported, etc.

In this regard, at 1140, the object is deleted from the container. Flow continues from 1140 to 1160, at which the file is created in the file storage device, and flow further continues to 1170, at which a success is output, returned, reported, etc.

Figure 13:
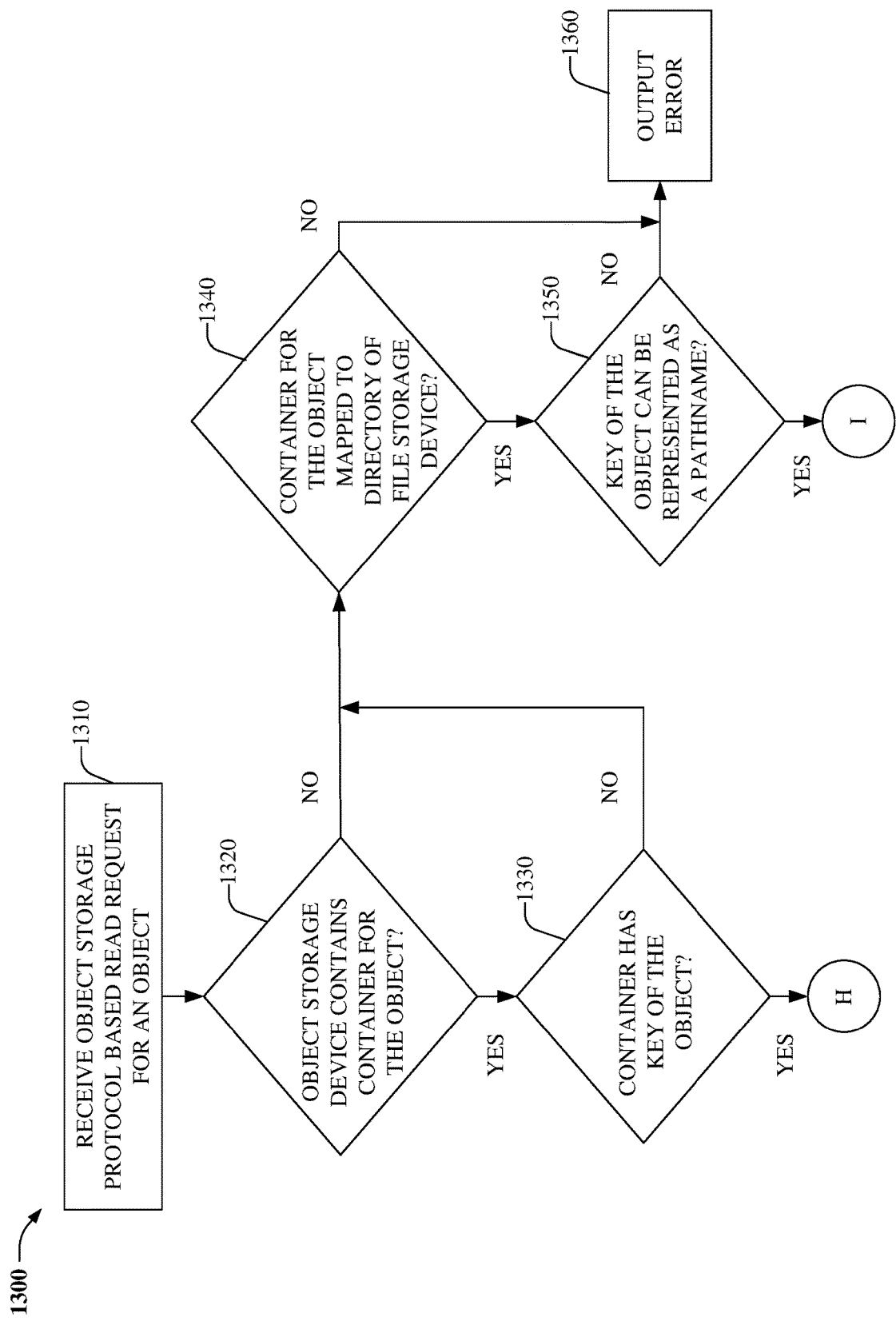
FIGS. 13-14 illustrate flow charts of a method that facilitates reading, via an object storage protocol, an object in a hybrid storage system, in accordance with various example embodiments.
Figure 14:
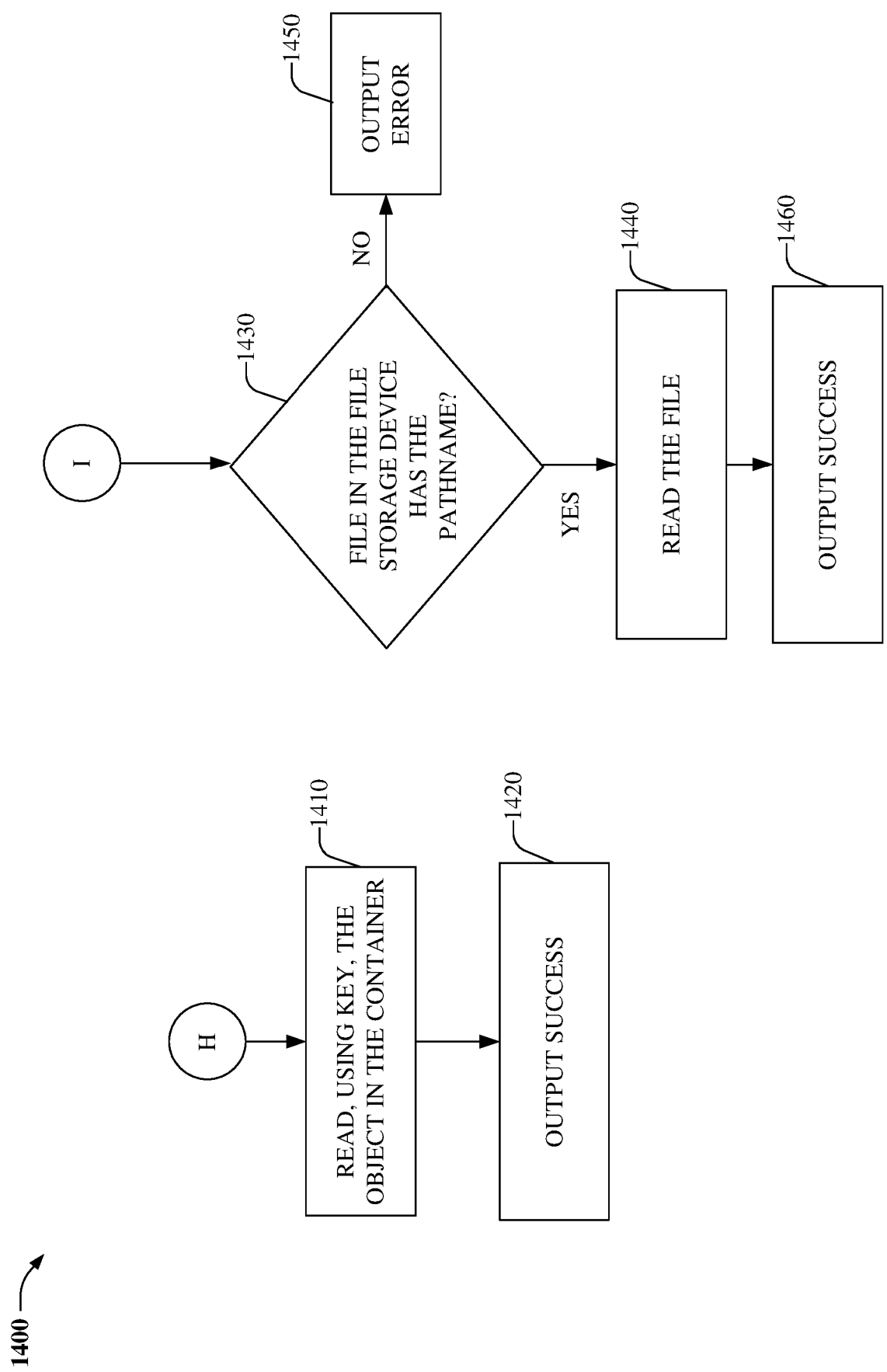

FIGS. 13-14 illustrate flow charts (1300 and 1400) of a method performed by a system (100), e.g., a hybrid storage system, that facilitates reading, via an object storage protocol, an object in the system, in accordance with various example embodiments. At 1310, an object protocol based read request for the object is received. At 1320, in response to a determination that the object storage device contains a container, bucket, etc. of the object, flow continues to 1330, at which it can be determined whether the container has a key of the object; otherwise flow continues to 1340, at which it can be determined whether the container for the object has been mapped to a directory of a file storage device.

In this regard, at 1330, if it is determined that the container has the key of the object, flow continues to 1410, at which the object is read in the container using the key, and flow further continues to 1420, at which a success is output, returned, reported, etc.; otherwise flow continues to 1340.

At 1340, if it is determined that the container for the object has been mapped to the directory, flow continues to 1350, at which it can be determined whether a key of the object can be represented as a pathname; otherwise flow continues to 1360, at which an error is output, returned, reported, etc.

At 1350, if it is determined that the key of the object can be represented as the pathname, flow continues to 1430, at which it can be determined whether the file has the pathname; otherwise flow continues to 1360, at which the error is output, returned, reported, etc.

At 1430, if it is determined that the file has the pathname, flow continues to 1440, at which the file is read, and flow continues to 1460, at which a success is output, returned, reported, etc.; otherwise flow continues to 1450, at which an error is output, returned, reported, etc.

Figure 15:
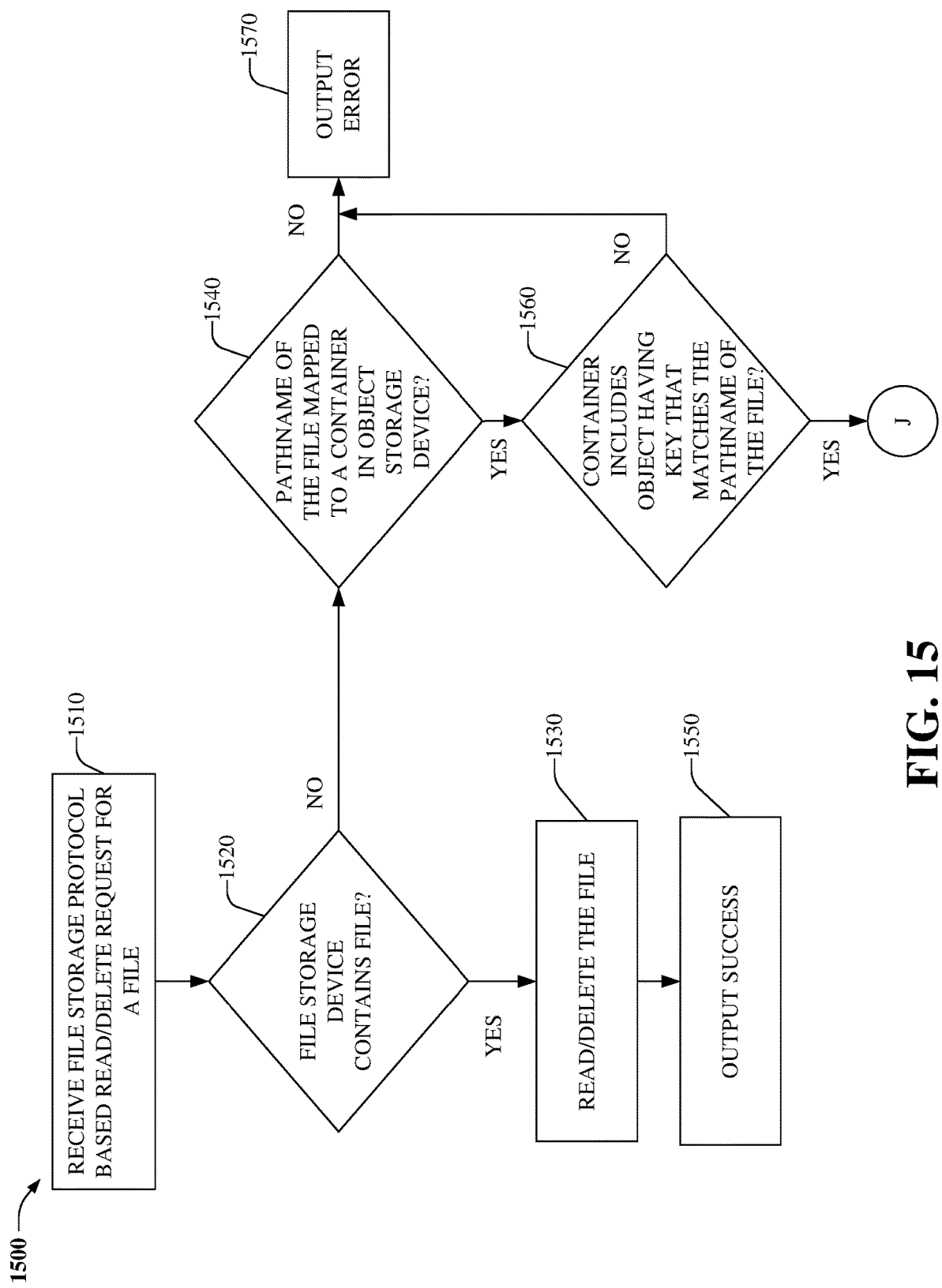
FIGS. 15-16 illustrate flow charts of a method that facilitates reading/deleting, via a file storage protocol, a file in a hybrid storage system, in accordance with various example embodiments.
Figure 16:
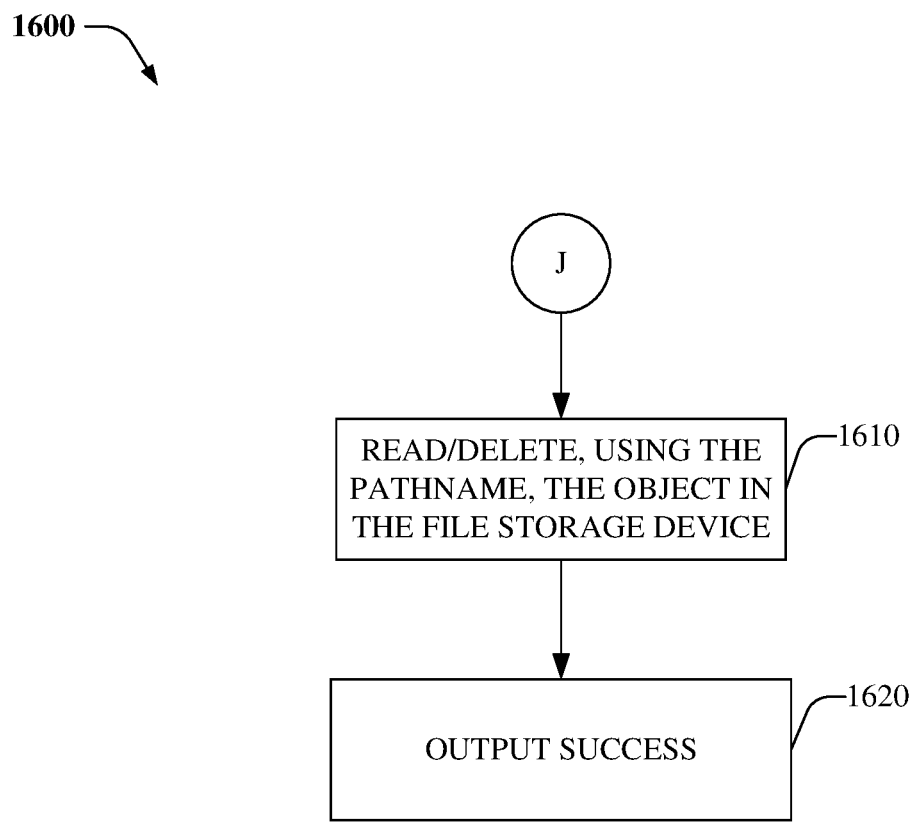

FIGS. 15-16 illustrate flow charts (1500 and 1600) of a method performed by a system (100), e.g., a hybrid storage system, that facilitates reading/deleting, via a file storage protocol, a file in the system, in accordance with various example embodiments.

At 1510, a file storage protocol based read/delete request for the file is received. At 1520, in response to a determination that the file storage device contains the file, flow continues to 1530, at which the file is read/deleted, and flow further continues to 1550, at which a success is output, returned, reported, etc.; otherwise flow continues to 1540, at which it can be determined whether a pathname of the file has been mapped to a container in the object storage device.

In this regard, at 1540, if it is determined that that pathname of the file has been mapped to the container, flow continues to 1560, at which it is determined whether the container includes an object having a key that matches the pathname of the file; otherwise flow continues to 1570, at which an error is output, returned, reported, etc.

At 1560, if it is determined that the container includes the object having the key that matches the pathname of the file, flow continues to 1610, at which the object is read/deleted in the file storage device using the pathname, and flow further continues to 1620, at which a success is output, returned, reported, etc.; otherwise flow continues to 1570, at which an error is output, returned, reported, etc.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store", "data storage", "storage device", "storage medium", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a node, a storage node, a data storage node, etc. (e.g., 1720, 1722), storage devices (e.g., 102, 104, 1740, 1742), non-volatile memory 1822 (see below), disk storage 1824 (see below), and/or memory storage 1846 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1820) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 18:
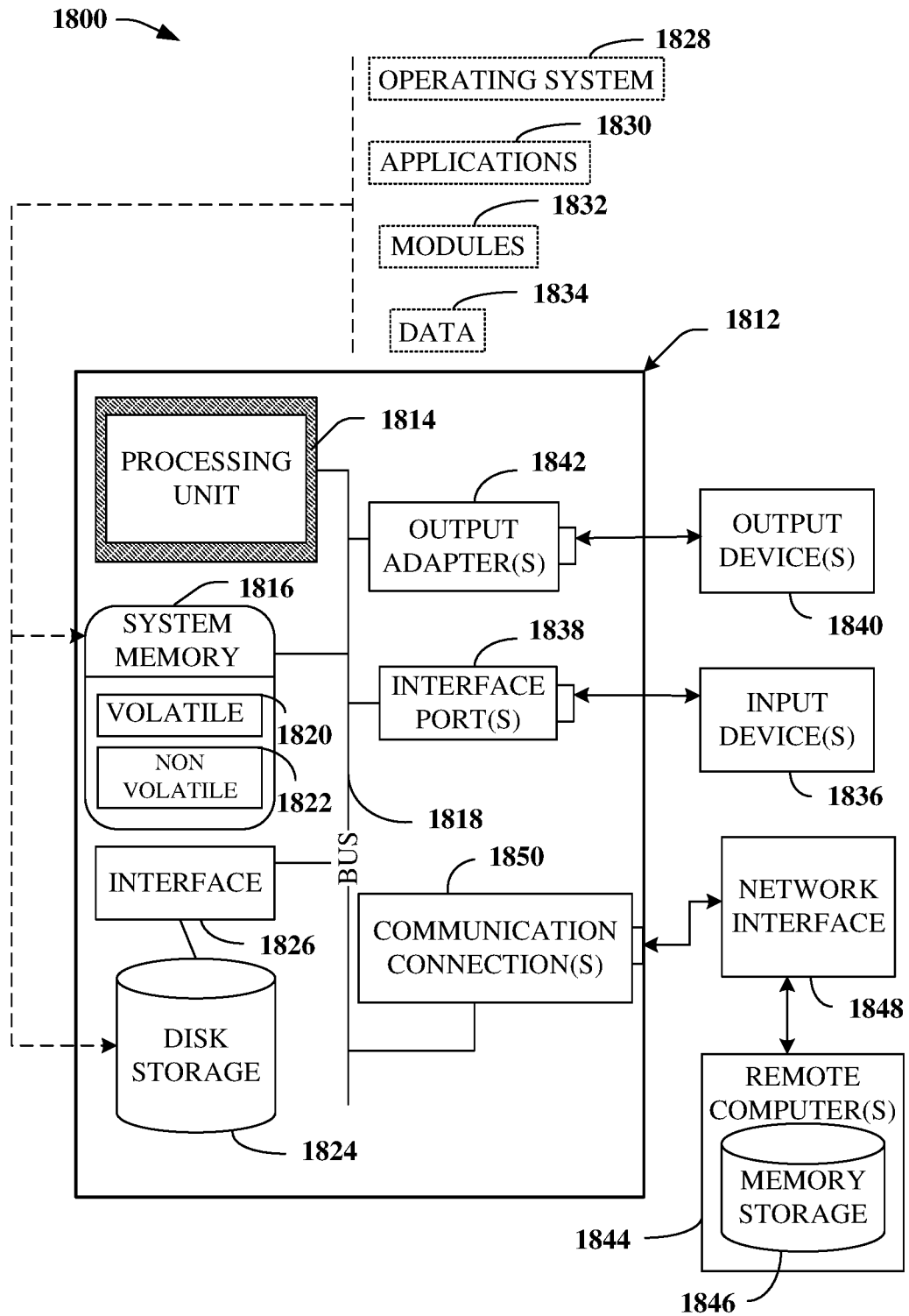
FIG. 18 illustrates a block diagram representing an illustrative non-limiting computing system or operating environment in which one or more aspects of various embodiments described herein can be implemented.

In order to provide a context for the various aspects of the disclosed subject matter, FIG. 18, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 18, a block diagram of a computing system 1800, e.g., 100, operable to execute the disclosed systems and methods is illustrated, in accordance with an embodiment. Computer 1812 comprises a processing unit 1814, a system memory 1816, and a system bus 1818. System bus 1818 couples system components comprising, but not limited to, system memory 1816 to processing unit 1814. Processing unit 1814 can be any of various available processors. Dual microprocessors and other multiprocessor architectures also can be employed as processing unit 1814.

System bus 1818 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1816 comprises volatile memory 1820 and nonvolatile memory 1822. A basic input/output system (BIOS), containing routines to transfer information between elements within computer 1812, such as during start-up, can be stored in nonvolatile memory 1822. By way of illustration, and not limitation, nonvolatile memory 1822 can comprise ROM, PROM, EPROM, EEPROM, or flash memory. Volatile memory 1820 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1812 also comprises removable/non-removable, volatile/non-volatile computer storage media. FIG. 18 illustrates, for example, disk storage 1824. Disk storage 1824 comprises, but is not limited to, devices like a magnetic disk drive, floppy disk drive, tape drive, Jaz drive, Zip drive, LS-100 drive, flash memory card, or memory stick. In addition, disk storage 1824 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to system bus 1818, a removable or non-removable interface is typically used, such as interface 1826.

It is to be appreciated that FIG. 18 describes software that acts as an intermediary between users and computer resources described in suitable operating environment 1800. Such software comprises an operating system 1828. Operating system 1828, which can be stored on disk storage 1824, acts to control and allocate resources of computer system 1812. System applications 1830 take advantage of the management of resources by operating system 1828 through program modules 1832 and program data 1834 stored either in system memory 1816 or on disk storage 1824. It is to be appreciated that the disclosed subject matter can be implemented with various operating systems or combinations of operating systems.

A user can enter commands or information into computer 1812 through input device(s) 1836. Input devices 1836 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1814 through system bus 1818 via interface port(s) 1838. Interface port(s) 1838 comprise, for example, a serial port, a parallel port, a game port, a universal serial bus (USB), a wireless based port, e.g., Wi-Fi, Bluetooth, etc. Output device(s) 1840 use some of the same type of ports as input device(s) 1836.

Thus, for example, a USB port can be used to provide input to computer 1812 and to output information from computer 1812 to an output device 1840. Output adapter 1842 is provided to illustrate that there are some output devices 1840, like display devices, light projection devices, monitors, speakers, and printers, among other output devices 1840, which use special adapters. Output adapters 1842 comprise, by way of illustration and not limitation, video and sound devices, cards, etc. that provide means of connection between output device 1840 and system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. Remote computer(s) 1844 can be a personal computer, a server, a router, a network PC, a workstation, a microprocessor based appliance, a peer device, or other common network node and the like, and typically comprises many or all of the elements described relative to computer 1812.

For purposes of brevity, only a memory storage device 1846 is illustrated with remote computer(s) 1844. Remote computer(s) 1844 is logically connected to computer 1812 through a network interface 1848 and then physically and/or wirelessly connected via communication connection 1850. Network interface 1848 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1850 refer(s) to hardware/software employed to connect network interface 1848 to bus 1818. While communication connection 1850 is shown for illustrative clarity inside computer 1812, it can also be external to computer 1812. The hardware/software for connection to network interface 1848 can comprise, for example, internal and external technologies such as modems, comprising regular telephone grade modems, cable modems and DSL modems, wireless modems, ISDN adapters, and Ethernet cards.

The computer 1812 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1812 can connect to other devices/networks by way of antenna, port, network interface adaptor, wireless access point, modem, and/or the like.

The computer 1812 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable components that, when executed by the processor, facilitate performance of operations by the system, the operations comprising:
receiving, via a file storage protocol corresponding to a file storage device or via an object storage protocol corresponding to an object storage device, a request to access a data entity; and
based on the request,
in response to the data entity being determined, via the object storage protocol, to be an object that has been represented, via a file reference, as a file in the file storage device, creating, via the object storage protocol, a new object comprising the data entity in the object storage device and deleting, via the object storage protocol, the file and the file reference in the file storage device, and
in response to the data entity being determined, via the file storage protocol, to be a file that has been represented, via an object reference, as the object in the object storage device, creating, via the file storage protocol, a new file comprising the data entity in the file storage device and deleting, via the file storage protocol, the object and the object reference in the object storage device.

2. The system of claim 1, wherein the request comprises at least one of an update request to update the data entity or a write request to replace the data entity.

3. The system of claim 1, wherein the operations further comprise:
in response to the object being determined, via the object storage protocol, to be represented by the object reference, updating the object in the object storage device.

4. The system of claim 3, wherein the updating comprises:
deleting the object from a container in the object storage device; and
creating the new object in the container.

5. The system of claim 1, wherein the operations further comprise:
in response to the object being determined, via the object storage protocol, to not be represented by any object reference, and in response to a container of the object being determined, via the object storage protocol, to not be mapped to a directory of the file storage device, creating the new object in the object storage device.

6. The system of claim 1, wherein the operations further comprise:
in response to the object being determined, via the object storage protocol, to not be represented by any object reference, and in response to a container of the object being determined, via the object storage protocol, to be mapped to a directory in the file storage device, determining, via the object storage protocol, whether an existing file in the file storage device comprises a pathname representing a key of the object.

7. The system of claim 6, wherein the operations further comprise:
in response to the existing file in the file storage device being determined, via the object storage protocol, to not comprise the pathname representing the key of the object, creating the new object in the object storage device.

8. The system of claim 1, wherein the data entity is an existing file, and wherein the operations further comprise:
in response to the existing file being determined, via the file storage protocol, to be represented by the file reference, updating the existing file.

9. The system of claim 8, wherein the updating comprises:
overwriting the existing file in the file storage device.

10. The system of claim 1, wherein the file is a first file, wherein the data entity is a second file, and wherein the operations further comprise:
in response to a pathname of the second file being determined, via the file storage protocol, to be mapped to a container in the object storage device, and in response the container being determined, via the file storage protocol, to not include any object that has a key that matches the pathname of the second file, creating the second file in the file storage device.

11. A method, comprising:
in response to receiving a request to access a data entity, determining, by a system comprising a processor, whether the request is based on an object storage protocol or a file storage protocol; and
in response to the request being determined to be based on the object storage protocol and in response to the data entity being determined to be an object that has been represented as a first file in a file storage device, creating, by the system, a first object comprising the data entity in an object storage device and deleting, by the system, the first file in the file storage device, and
in response to the request being determined to be based on the file storage protocol and in response to the data entity being determined to be a file that has been represented as a second object in the object storage device, creating, by the system, a second file comprising the data entity in the file storage device and deleting, by the system, the second object in the object storage device.

12. The method of claim 11, wherein the creating the first object comprises:
in response to the request being determined to be based on the object storage protocol and in response to the data entity being determined to be stored as an object in the object storage device, deleting the object from a container in the object storage device and creating the first object in the container.

13. The method of claim 11, wherein the data entity is an object, and further comprising:
in response to the request being determined to be based on the object storage protocol, in response to the object storage device being determined to not contain a container of the object, and in response to the container of the object being determined to not be represented as a directory in the file storage device, creating, by the system, the object in the object storage device.

14. The method of claim 11, wherein the data entity is an object, and further comprising:
in response to the request being determined to be based on the object storage protocol, in response to the object storage device being determined to not contain a container of the object, and in response to the container of the object being determined to be represented as a directory in the file storage device, determining, by the system, whether an existing file in the file storage device comprises a pathname representing a key of the object.

15. The method of claim 14, further comprising:
in response to the existing file in the file storage device being determined to comprise the pathname representing the key of the object, deleting, by the system, the existing file and creating, by the system, the object in the object storage device.

16. The method of claim 14, further comprising:
in response to the existing file in the file storage device being determined to not comprise the pathname representing the key of the object, creating, by the system, the object in the object storage device.

17. The method of claim 11, further comprising:
in response to the request being determined to be based on the file storage protocol, and in response to the data entity being determined to be stored as a file in the file storage device, overwriting, by the system, the file.

18. The method of claim 11, wherein the data entity is a file, and further comprising:
in response to the request being determined to be based on the file storage protocol, in response to the object storage device being determined to contain a container that has been mapped to a pathname of the file, and in response to the container being determined to not include an object having a key that matches the pathname of the file, creating, by the system, the file in the file storage device.

19. A non-transitory machine-readable medium comprising instructions that, in response to execution, cause a system comprising a processor to perform operations, comprising:

determining whether a request to modify a data entity is based on an object storage protocol or a file storage protocol; and in response to the request being determined to be based on the object storage protocol and in response to the data entity being determined to be a first object that is represented as a first file in a file storage device, creating the first object in an object storage device and deleting the first file; and in response to the request being determined to be based on the file storage protocol and in response to the data entity being determined to be a second file that is represented as a second object in the object storage device, creating the second file in the file storage device and deleting the second object.

20. The non-transitory machine-readable storage medium of claim 19, wherein the operations further comprise:
in response to the request being determined to be based on the object storage protocol and in response to the data entity being determined to be an object that is stored in the object storage device, deleting the object in the object storage device and creating a new object comprising the data entity in the object storage device; and in response to the request being determined to be based on the file storage protocol and in response to the data entity being determined to be a file that is stored in the file storage device, overwriting the file in the file storage device.

* * * * *